United States Patent
Hughes

(10) Patent No.: US 7,373,467 B2
(45) Date of Patent: May 13, 2008

(54) STORAGE DEVICE FLOW CONTROL

(75) Inventor: Brian William Hughes, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 11/032,753

(22) Filed: Jan. 10, 2005

(65) Prior Publication Data

US 2005/0257012 A1 Nov. 17, 2005

Related U.S. Application Data

(60) Provisional application No. 60/572,272, filed on May 17, 2004.

(51) Int. Cl.
*G06F 12/00* (2006.01)
*G06F 13/00* (2006.01)
*G06F 13/28* (2006.01)
*G06F 9/46* (2006.01)
*G06F 3/00* (2006.01)
*G06G 5/00* (2006.01)

(52) U.S. Cl. .............. 711/158; 711/151; 711/163; 718/103; 710/28; 710/36; 710/56; 710/57

(58) Field of Classification Search .............. 711/151, 711/158, 170, 172, 163; 709/28, 36, 39, 709/40, 44, 56, 57, 107, 240, 244, 225; 718/103
See application file for complete search history.

(56) References Cited

U.S. PATENT DOCUMENTS

| | | | |
|---|---|---|---|
| 6,173,378 B1 * | 1/2001 | Rozario et al. | 711/163 |
| 6,343,350 B1 * | 1/2002 | LaMaire et al. | 711/156 |
| 6,532,501 B1 * | 3/2003 | McCracken | 710/52 |
| 6,601,151 B1 * | 7/2003 | Harris | 711/158 |
| 6,625,700 B2 * | 9/2003 | Ma et al. | 711/151 |
| 6,715,008 B2 | 3/2004 | Shimizu | |
| 6,877,049 B1 * | 4/2005 | Myers | 710/56 |
| 7,137,119 B1 * | 11/2006 | Sankaranarayan et al. | 718/103 |
| 7,155,717 B2 * | 12/2006 | Mehta | 718/102 |

* cited by examiner

*Primary Examiner*—Brian Peugh
*Assistant Examiner*—Ryan Bertram

(57) ABSTRACT

A method for allocating data write credits for a storage device includes gathering requests for the data write credits from a plurality of data sources and assembling the plurality of data sources in a prioritized list. The method also includes removing lowest priority data sources one by one from the prioritized list until a total of the requests made by all data sources remaining in the prioritized list are within a number of available data write credits, and granting the requests for all the data sources remaining in the prioritized list.

15 Claims, 4 Drawing Sheets

STORAGE DEVICE FLOW CONTROL

This application claims the benefit of U.S. Provisional Application No. 60/572,272, filed May 17, 2004, for STORAGE DEVICE FLOW CONTROL of Brian W. Hughes which is hereby incorporated by reference for all that is disclosed therein.

BACKGROUND

Most modern electronic devices contain memory for storing data either temporarily or long-term, such as televisions that store the last channel viewed, cellular telephones that store telephone numbers and information about incoming calls, etc. A wide variety of memory systems are known, such as random-access memories and stack-type memories. Each type of memory system has strengths and weaknesses and is used in different types of applications. For example, random-access memories are commonly used when a great deal of storage space is required and each piece of data must be individually accessible at any time. A random-access memory requires relatively complex addressing circuitry, enabling each piece of data to be addressed and retrieved at any time, in any order.

For other applications, simpler memory systems may be acceptable or desirable. One such memory system is a stack-type memory, in which data is sequentially stored in a list and retrieved in a predetermined order, rather than each piece of data being individually addressable and accessible at any time. As data is written into the stack-type memory, it fills the memory as if adding to a stack or pile of data. As data is read out of the stack-type memory, it empties the memory as if removing items from the stack, leaving room for more data to be written. A typical stack-type memory is a first-in first-out (FIFO) memory, in which the first piece of data written to an input of the FIFO will be the first piece of data read back from an output of the FIFO. A common application for stack-type memory systems is as a communications buffer between two electronic circuits. If the first electronic circuit sends a stream of data to the second electronic circuit, the second typically must temporarily store or buffer the data as it arrives, until it is ready to use the data. If the second electronic circuit uses the data in the order in which it is received, there is typically no need to randomly access the pieces of data in any other order, and a FIFO is a simple and inexpensive storage device fitting these requirements.

One disadvantage of a stack-type memory is that it can overflow and lose data if it continues to receive data after becoming full, before any data is read from the memory to free up space.

SUMMARY

An exemplary embodiment may comprise a method for allocating data write credits for a storage device, the method including gathering requests for the data write credits from a plurality of data sources and assembling the plurality of data sources in a prioritized list. The method also includes removing lowest priority data sources one by one from the prioritized list until a total of the requests made by all data sources remaining in the prioritized list are within a number of available data write credits, and granting the requests for all the data sources remaining in the prioritized list.

BRIEF DESCRIPTION OF THE DRAWINGS

Illustrative embodiments are shown in the accompanying drawings as described below.

DESCRIPTION

Figure 1:
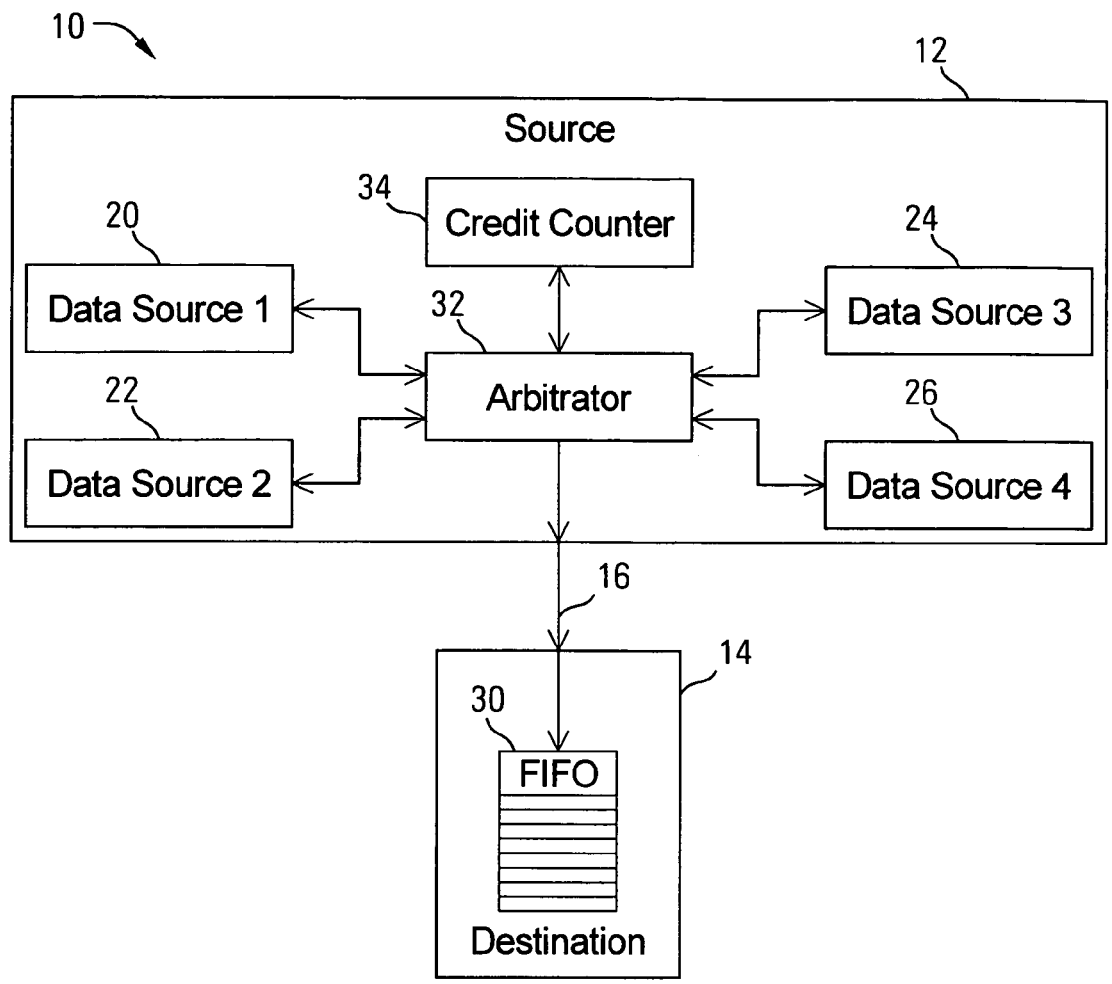
FIG. 1 is a block diagram of an exemplary source and destination illustrating data flow.

The drawing and description, in general, disclose a method and apparatus for controlling the flow of data from a group of data sources to a shared or communal storage device. In one exemplary embodiment, the storage device comprises a stack-type memory such as a first-in first-out (FIFO) memory. The flow of data to the FIFO is controlled by allocating data write credits to the group of data sources in response to their requests. Data may be written to the storage device by a data source only when it is granted credits, one credit per data item, thereby preventing the storage device from overflowing and discarding data. The method and apparatus for controlling data flow to the shared storage device disclosed herein enables multiple simultaneous credit requests to be arbitrated and prioritized, with multiple requests granted simultaneously if sufficient credits are available.

An exemplary system 10 containing such a shared storage device and a group of data sources is illustrated in FIG. 1. Data is transmitted between a source 12 and a destination 14 over any suitable type of connection 16, such as a direct cable connection, network connection, wireless connection, etc. The source 12 contains a group of data sources 20, 22, 24 and 26, from which data is sent to the storage device 30 in the destination 14. An arbitrator 32 communicates with the data sources 20, 22, 24 and 26, receiving requests for credits and granting or denying the requests. A credit counter 34 in the source 12 contains the number of available credits representing empty spaces or slots in the storage device. The arbitrator 32 reads the credit counter 34 to obtain the number of available credits as it determines which credit requests to grant, if any.

Figure 2:
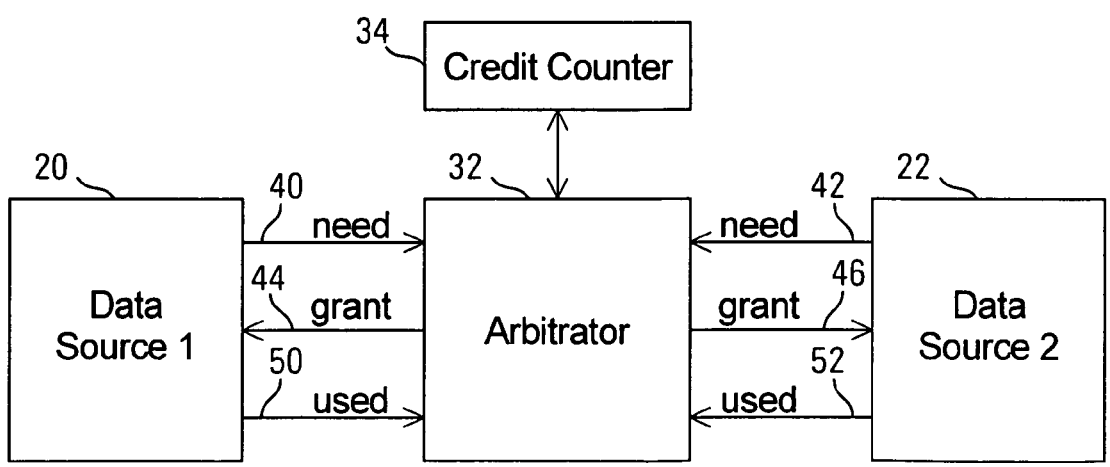
FIG. 2 is a block diagram of an exemplary arbitrator controlling flow of data from a pair of data sources to a destination.

A portion of the system 10 is reproduced in FIG. 2 illustrating messages passing between the arbitrator 32 and two of the data sources 20 and 22. During operation of the system 10, the data sources (e.g., 20 and 22) may transmit a request for credits to the arbitrator 32 that would allow them to write data to the storage device 30 in the destination 14. Each data source (e.g., 20 and 22) that has data to store in the storage device 30 indicates to the arbitrator 32 the number of credits it needs 40 and 42. The arbitrator 32 obtains the number of available credits from the credit counter 34 and determines whether it can grant the requests. If so, it indicates 44 and 46 to the requesters 20 and 22 that the credit requests are granted. The requesters 20 and 22 may then write the data to the storage device 30.

In one exemplary embodiment, the data sources 20 and 22 may for any number of reasons not use all the granted credits. In this case, the data sources 20 and 22 transmit the number of credits used 50 and 52 to the arbitrator 32, which updates the credit counter 34 by subtracting the used credits from the available credit count.

The number of available credits in the credit counter 34 is increased as data is read out of or cleared from the storage device 30. Credits may be increased in the credit counter 34 by the arbitrator 32 or by another element (not shown) that manages data read operations from the storage device 30.

As will be described in more detail below, the arbitrator 32 in one exemplary embodiment prioritizes the data sources requesting credits, granting the highest priority requests first. The priorities of the data sources may be determined by the arbitrator 32 or may be provided to the arbitrator 32 by another element of the system 10. In an alternative embodiment, the arbitrator 32 may base the order of request consideration on the number of requested credits rather than on the priority of the requester.

The method and apparatus for controlling the flow of data from a group of data sources to a storage device is not limited to the configuration illustrated in FIGS. 1 and 2. For example, the data sources 20, 22, 24 and 26 and storage device 30 need not be in different elements 12 and 14 or locations. Any number of data sources may be supported, from two and up. A single data source may also be supported, although the need for prioritized arbitration is eliminated when only one data source is requesting credits. Data sources 20, 22, 24 and 26 need not request credits during every write cycle, and only those that do request credits are included in the credit request processing by the arbitrator 32. The data sources 20, 22, 24 and 26 are not necessarily the creator or originator of the data written to the storage device 30. The data sources 20, 22, 24 and 26 may just be a conduit from an earlier point in a system. The format and content of the data from the data sources 20, 22, 24 and 26 is not limited in any way by the method and apparatus for controlling the flow of data. For example, data items may contain an identification of the data source (e.g., 20) from which they came, or an identification of an ultimate downstream destination, if desired. Data may be transmitted in any suitable manner, such as by a packet-based bus architecture, a serial data stream, etc.

The method and apparatus for controlling data flow to the storage device arbitrates multiple simultaneous credit requests, with multiple requests granted simultaneously if sufficient credits are available. Note that simultaneous granting of credits, or simultaneous writing of data by multiple data sources, does not necessarily mean that the data sources receive the credits at the same instant or that they may all transmit data for storage in the storage device at the same instant. Rather, simultaneous granting of credits or simultaneous writing of data means that the arbitrator collects and processes credit requests from the data sources together, for example, in one write cycle in the system, rather than processing only one credit request at a time.

In one exemplary embodiment in which the data sources are prioritized, the method and apparatus for controlling data flow to the storage device holds off all low priority requests until high priority requests are complete. In this embodiment, all credit requests are denied until enough credits are available for the highest priority requester, preventing small but frequent low priority requests from keeping the storage device too full for a large high priority request.

Figure 3:
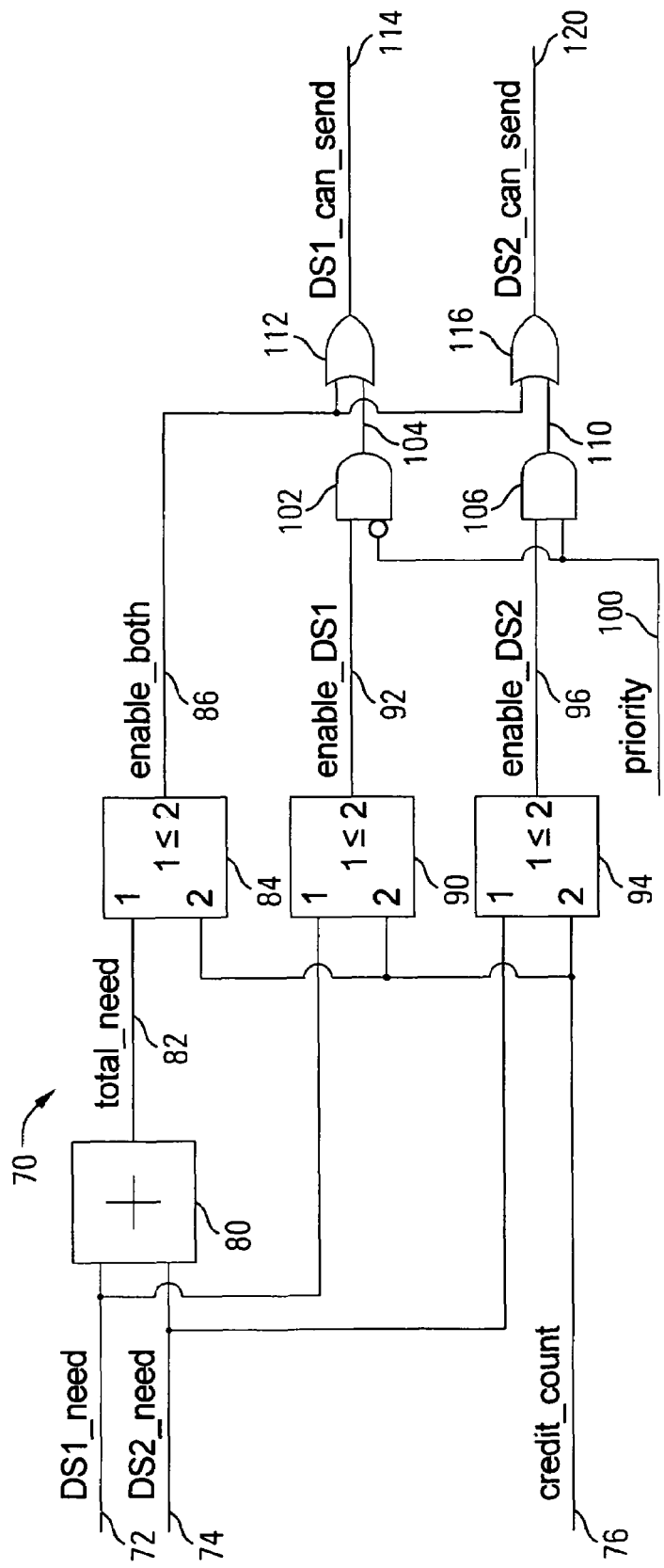
FIG. 3 is a block diagram of an exemplary circuit for processing requests for data write credits to a pair of data sources.

Referring now to FIG. 3, an exemplary circuit 70 for processing credit requests will be described. This exemplary circuit 70 processes credit requests from two data sources based on credit request inputs DS1_need 72 and DS2_need 74 from the two data sources and on an available credit count input credit_count 76. An adder 80 is used to calculate a total credit request total_need 82 by adding the credit requests DS1_need 72 and DS2_need 74 from the two data sources. Three comparators 84, 90 and 94 compare the total credit request total_need 82, the credit request DS1_need 72 from data source one, and the credit request DS2_need 74 from data source two, respectively, with the available number of credits credit_count 76. If the number of available credits credit_count 76 is greater than the total credit request total_need 82, the enable_both signal 86 will be asserted, indicating that sufficient credits are available to grant the requests from both data sources. If the number of available credits credit_count 76 is greater than the credit request DS1_need 72 from data source one, the enable_DS1_signal 92 will be asserted, indicating that sufficient credits are available to grant the request from data source one. If the number of available credits credit_count 76 is greater than the credit request DS2_need 74 from data source two, the enable_DS2 signal 96 will be asserted, indicating that sufficient credits are available to grant the request from data source two.

The data sources are prioritized, based on the value of the priority signal 100. If the value of the priority signal 100 is zero, data source one (on input 72) has the highest priority. If the value of the priority signal 100 is one, data source two (on input 74) has the highest priority. Two AND gates 102 and 106 are used to apply the priority signal 100 to the enable_DS1 signal 92 and the enable_DS2 signal 96 so that one or the other of the individual credit requests, but not both, can be granted. The only way in the exemplary circuit 70 for both credit requests to be granted is if there are sufficient available credits for the sum of the two requests, as determined by the adder 80. The first AND gate 102 has two inputs, the enable_DS1 signal 92 and an inverted version of the priority signal 100. The output 104 of the first AND gate 102 is asserted only if the enable_DS1 signal 92 is asserted, indicating that there are sufficient available credits for the credit request DS1_need 72 from data source one, and that data source one has priority. The second AND gate 106 has two inputs, the enable_DS2 signal 96 and the priority signal 100. The output 110 of the second AND gate 106 is asserted only if the enable_DS2 signal 96 is asserted, indicating that there are sufficient available credits for the credit request DS2_need 74 from data source two, and that data source two has priority.

The output signals 114 and 120 each indicate to one of the data sources that their credit request has been granted. The first, DS1_can_send 114, enables the first data source to write its data entries to the storage device, up to the number of credits it requested. The second, DS2_can_send 120, enables the second data source to write its data entries to the storage device, up to the number of credits it requested. The DS1_can_send signal 114 is generated by an OR gate 112 with two inputs, the first connected to the enable_both signal 86, the second connected to the output 104 of the first AND gate 102. The DS1_can_send signal 114 is therefore asserted when the enable_both signal 86 is asserted or the enable_DS1 signal 92 is asserted and data source one has priority (when the priority signal 100 is low). The DS2_send signal 120 is generated by an OR gate 116 with two inputs, the first connected to the enable_both signal 86, the second connected to the output 110 of the second AND gate 106. The DS2_can_send signal 120 is therefore asserted when the enable_both signal 86 is asserted or the enable_DS2 signal 92 is asserted and data source two has priority (when the priority signal 100 is high).

The following state table illustrates the operation of the exemplary circuit 70. The state table includes values for the signals DS1_need 72, DS2_need 74, credit_count 76 (listed as "credits"), priority 100, DS1_can_send 114 and DS2_can_send 120 (listed as DS1_CS and DS2_CS).

| DS1_need | DS2_need | credits | priority | DS1_CS | DS2_CS |
|---|---|---|---|---|---|
| 8 | 2 | 10 | x | 1 | 1 |
| 8 | 2 | 8 | 0 | 1 | 0 |
| 8 | 2 | 8 | 1 | 0 | 1 |
| 8 | 2 | 2 | 0 | 0 | 0 |
| 8 | 2 | 2 | 1 | 0 | 1 |
| 8 | 2 | 0 | x | 0 | 0 |

In all cases in the state table, the first data source requests eight credits using the DS1_need signal 72, and the second data source requests two credits using the DS2_need signal 74. In the first case shown in the first row of the state table, there are ten available credits, indicating that the storage device has ten empty slots. In this case, the total_need signal 82 calculated by the adder 80 is eight plus two or ten. The comparator 84 compares the total need (ten) with the available credit (ten), and because there are sufficient available credits to grant this total request, asserts the enable_both signal 86. (The exemplary circuit 70 uses active high logic, so asserted signals have a high value, or the value one, whereas unasserted signals have a low value, or the value zero.) Both outputs DS1_can_send 114 and DS2_can_send 20 are therefore asserted by the OR gates 112 and 116, regardless of the state of the priority signal 100 and the enable_DS1 and enable_DS2 signals 92 and 96.

In the second case shown in row two of the state table, there are only eight available credits, enough to grant either request, but not both. The priority signal 100 is zero, giving priority to data source one and its request on DS1_need 72. The enable_DS1 and enable_DS2 signals 92 and 96 will both be asserted, because there are enough available credits to grant either request. The enable_both signal 86 will not be asserted, because there are not enough available credits to grant both. The DS1_can_send signal 114 will be asserted, granting the request of data source one, because enable_DS1 92 and the inverse of priority 100 are both asserted, which asserts the output 104 of the AND gate 102. The DS2_can_send signal 120 will not be asserted, because although the enable_DS2 signal 96 is asserted, the priority signal 100 is not, so the AND gate 106 masks out the enable_DS2 signal 96.

In the third case shown in row three of the state table, there are again only eight available credits, enough to grant either request, but not both. The priority signal 100 is one, giving priority to data source two and its request on DS2_need 74. The enable_DS1 and enable_DS2 signals 92 and 96 will both be asserted, because there are enough available credits to grant either request. The enable_both signal 86 will not be asserted, because there are not enough available credits to grant both. The DS2_can_send signal 120 will be asserted, granting the request of data source two, because enable_DS2 96 and priority 100 are both asserted, which asserts the output 110 of the AND gate 106. The DS1_can_send signal 114 will not be asserted, because although the enable_DS1 signal 92 is asserted, the inverse of the priority signal 100 is not, so the AND gate 102 masks out the enable_DS1 signal 92.

In row four of the state table, there are only two credits, enough to grant only the request from data source two. The priority signal 100 is zero, giving priority to data source one and its request on DS1_need 72. The enable_both and enable_DS1 signals 86 and 92 are not asserted because there are not enough available credits to grant the request from both data sources or from data source one alone. The enable_DS2 signal 96 is asserted, because there are enough available credits to grant the request from data source two. Neither output signal DS1_can_send 114 or DS2_can_send 120 will be asserted, even though there are enough available credits to grant the request from data source two, because there are not enough available credits to grant the request from the higher priority request from data source one. The AND gate 106 masks off the enable_DS2 signal 96 because the priority signal 100 is zero. The logic thus holds off lower priority requests until higher priority requests can be granted.

In row five of the state table, there are only two credits, enough to grant only the request from data source two. The priority signal 100 is one, giving priority to data source two and its request on DS2_need 74, in contrast to the case shown in row four of the state table and discussed above. In this case, the higher priority request by data source two on DS2_need is granted, asserting DS2_can_send 120 but not DS1_can_send 114.

Finally, in row six of the state table, there are no available credits, so no requests are granted regardless of the state of the priority signal 100, and neither output signal DS1_can_send 114 or DS2_can_send 120 is asserted.

In the exemplary circuit 70, if the data sources do not need any credits, the input signals DS1_need 72 or DS2_need 74 would be set to a state indicating that zero credits are needed. Because a request for zero credits is always less than or equal to the number of available credits, the grant signal DS1_can_send 114 or DS2_can_send 120 may be asserted depending on the value of the priority signal 100. The data source ignores such a granted request if it needed no credits. In alternative embodiments, the exemplary circuit 70 may be modified with another signal from each data source indicating whether it is making a request to avoid granting a request for zero credits, or the inputs DS1_need 72 or DS2_need 74 may be checked in the circuit to disable the outputs DS1_can_send 114 or DS2_can_send 120 if the input request value is zero.

Figure 4:
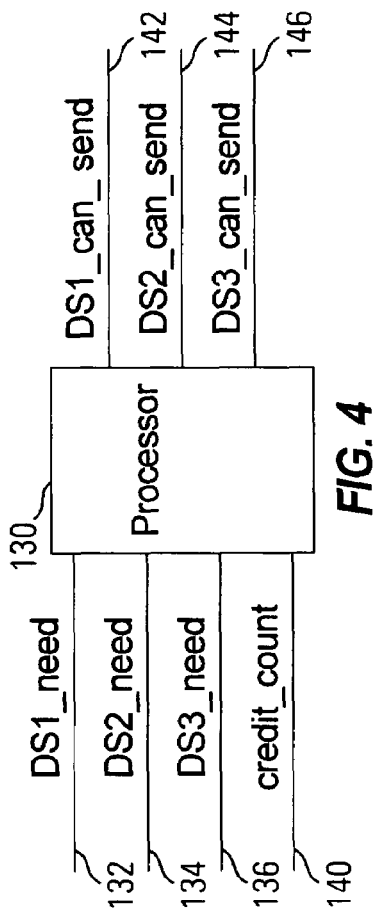
FIG. 4 is a block diagram of an exemplary processor-based apparatus for processing requests for data write credits to three data sources.

Referring now to FIG. 4, the method and apparatus for controlling the flow of data from a group of data sources to a shared storage device may be implemented using a processor 130 executing program code. The exemplary processor-based apparatus illustrated in FIG. 4 arbitrates credit requests from three data sources based on three credit request inputs 132, 134 and 136 from the three data sources and on the available credit count 140. In this embodiment, the processor 130 either assigns priorities that are established in advance and included in the program code to the three data sources, or generates priorities during execution using any suitable algorithm. For example, the processor 130 may apply a rotating priority scheme to give each data source a turn at highest priority. The processor 130 may alternatively base priorities on data traffic statistics, such as on frequency and size of credit requests from each data source. The processor 130 asserts the three outputs, DS1_can_send 142, DS2_can_send 144 and DS3_can_send 146, to grant the credit requests of the three data sources, enabling them to write to the shared storage device.

The processor 130 may execute program code such as the following exemplary pseudo-code for determining when to assert the three outputs, DS1_can_send 142, DS2_can_send 144 and DS3_can_send 146. In the embodiment illustrated in FIG. 4, the number of requesters, n, is three.

Gather credit requests from n requesters

Calculate a total credit request for each requester, where t0=total number of credits requested from all requesters t1=total number of credits requested from all requesters except the lowest priority requester t2=total number of credits requested from all requesters except the two lowest priority requesters . . .

tn=credits requested by the highest priority requester

Grant credits as follows

```
if t0 <= the number of credits available
    {grant all requests}
else if t1 <= the number of credits available
    {grant all requests except lowest priority
    request}
else if t2 <= the number of credits available
    {grant all requests except two lowest priority
    requests}
...
else if tn <= the number of credits available
    {grant highest priority request}
else
    {grant no requests}
```

Figure 5:
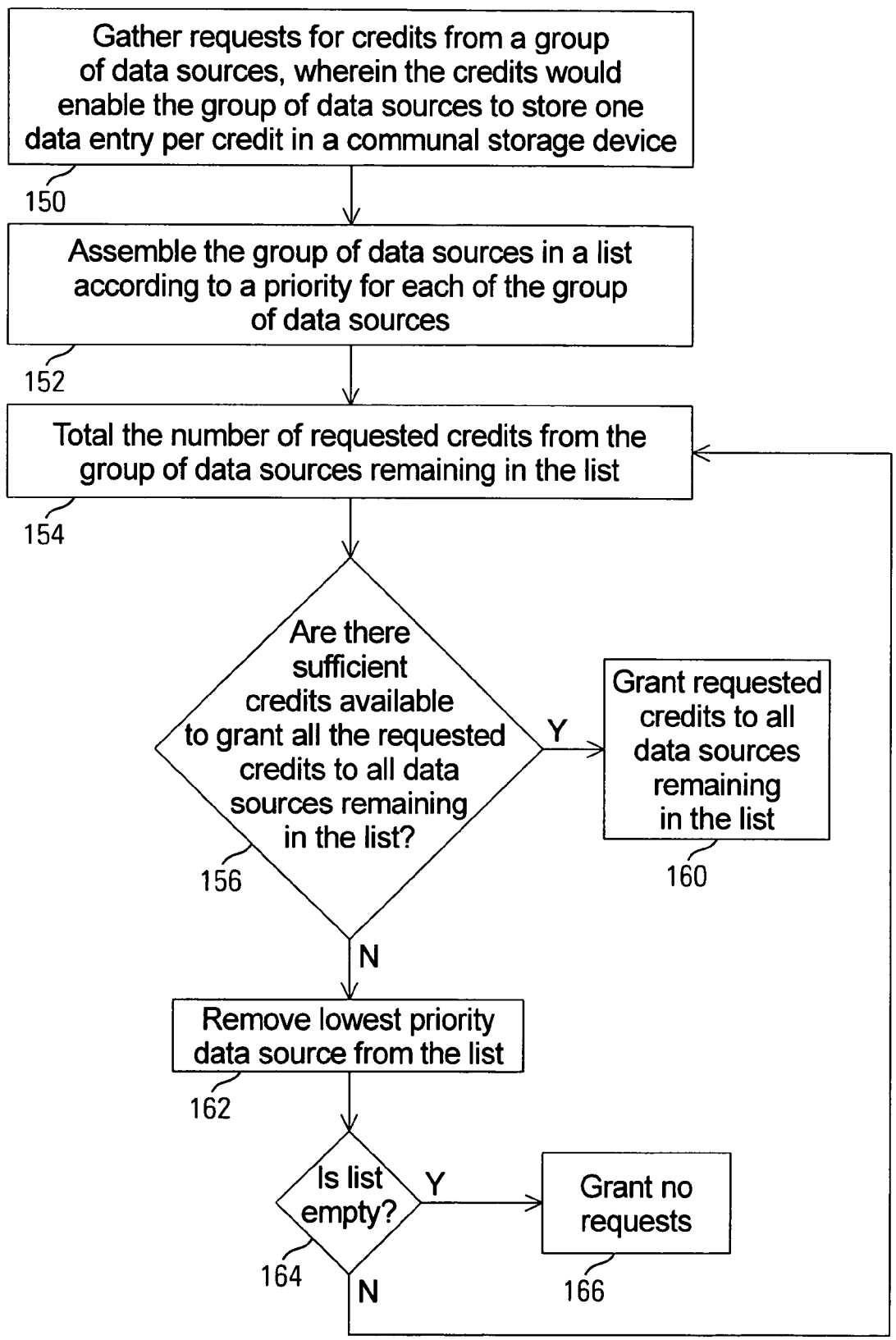
FIG. 5 is a flow chart of an exemplary operation for processing requests for data write credits from a group of data sources, enabling them to store data in a communal storage device.

Referring now to FIG. 5, an exemplary operation for processing credit requests from a group of data sources for a communal storage device is shown. Requests for credits are gathered 150 from a group of data sources. The requested credits, if granted, would enable the group of data sources to store one data entry per credit in a communal storage device. The group of data sources is assembled 152 in a list according to a priority for each of the group of data sources. The number of requested credits from the group of data sources remaining in the list is totaled 154. If 156 there are sufficient credits available to grant all the requested credits to all data sources remaining in the list, the requested credits are granted 160 to all data sources remaining in the list. If 156 there are not sufficient credits available to grant all the requested credits to all data sources remaining in the list, the lowest priority data source is removed 162 from the list. If 164, at this point, the list is empty, no requests are granted 166. If 164 the list is not empty, the number of requested credits from the group of data sources remaining in the list is again totaled 154 and the process continues until a group of data sources is identified for whose requests sufficient credits are available, or until the list is empty.

Figure 6:
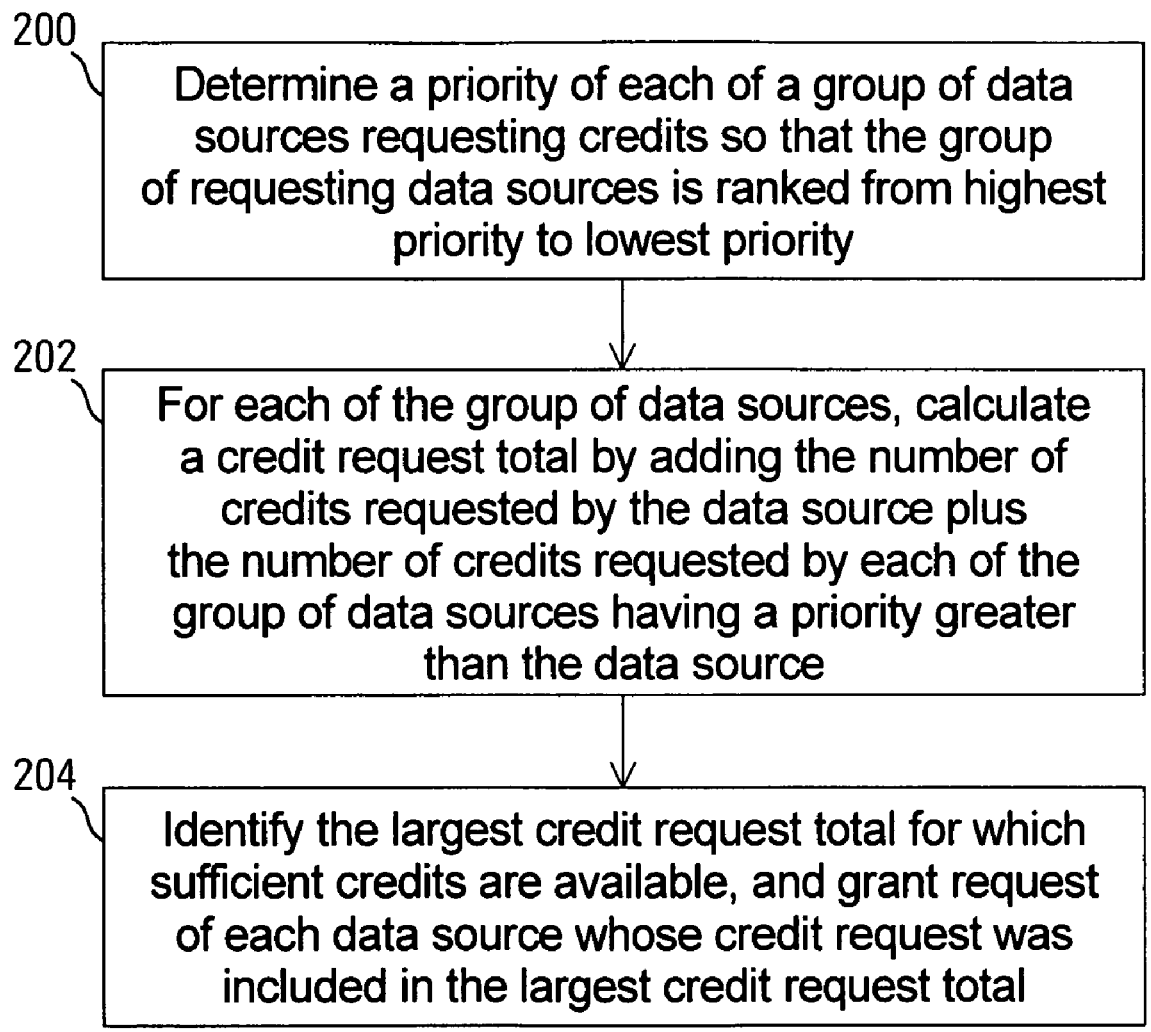
FIG. 6 is a flow chart of another exemplary operation for processing requests for data write credits from a group of data sources, enabling them to store data in a communal storage device.

Referring now to FIG. 6, another exemplary operation for processing credit requests from a group of data sources for a communal storage device is shown, this embodiment corresponding more closely with the pseudo-code listed above with respect to FIG. 4. A priority is determined 200 for each of a group of data sources requesting credits so that the group of requesting data sources is ranked from highest priority to lowest priority. For each of the group of data sources, a credit request total is calculated 202 by adding the number of credits requested by the data source plus the number of credits requested by each of the group of data sources having a priority greater than the data source. The largest credit request total for which sufficient credits are available is identified 204, and the request of each data source whose credit request was included in the largest credit request total is granted.

An exemplary embodiment of the apparatus for controlling data flow to a storage device may comprise computer readable program code stored on at least one computer readable medium for execution in a processor (e.g., 130) such as that illustrated in FIG. 4. The exemplary computer readable program code includes code for determining a priority of each of a plurality of data sources requesting credits. The computer readable program code also includes code which, for each of the plurality of data sources, calculates a credit request total by adding a number of credits requested by the data source plus a number of credits requested by each of the plurality of data sources having a priority greater than the data source. The computer readable program code also includes code for identifying a largest credit request total for which sufficient credits are available, and for granting the request of each data source whose credit request was included in the largest credit request total.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method for allocating data write credits for a storage device, the method comprising:
   gathering requests for said data write credits from a plurality of data sources;
   assembling said plurality of data sources in a prioritized list;
   removing lowest priority data sources one by one from said prioritized list until a total of the requests made by all data sources remaining in said prioritized list is within a number of available data write credits; and
   granting said requests for all said data sources remaining in said prioritized list.

2. The method of claim 1, wherein a granted request for said data write credits enables a data source receiving said data write credits to write a number of data entries equal to a number of credits in said granted request to said storage device.

3. The method of claim 1, wherein no requests are granted if said prioritized list is emptied while removing said lowest priority data sources.

4. The method of claim 1, wherein any of said plurality of data sources that make no request are excluded from said prioritized list.

5. The method of claim 1, further comprising calculating said total of said requests made by all data sources remaining in said prioritized list each time said prioritized list is changed.

6. The method of claim 1, wherein said assembling said plurality of data sources in said prioritized list comprises reading a priority for each of said plurality of data sources.

7. The method of claim 1, wherein said assembling said plurality of data sources in said prioritized list comprises assigning a priority to each of said plurality of data sources.

8. The method of claim 1, further comprising reading said number of available data write credits from a credit counter.

9. The method of claim 8, further comprising gathering a used credit count from each of said data sources whose requests were granted, wherein said used credit counts indicate how many credits were actually used by said data sources, said method further comprising updating said credit counter based on said used credit counts.

10. A method of processing requests from a plurality of data sources for data write credits for a communal storage device, the method comprising:
    gathering said data write credit requests;
    identifying a priority of each of said plurality of data sources;
    adding said data write credit requests;
    granting all of said data write credit requests if sufficient credits are available for all said data write requests;
    granting said data write credit request for a highest priority data source if sufficient credits are available; and
    granting said data write credit request for a lowest priority data source if sufficient credits are available and if said data write credit request for said highest priority data source has also been granted, wherein all ungranted requests are denied.

11. An apparatus for controlling data flow to a storage device, comprising:
    a. at least one computer readable medium; and
    b. computer readable program code stored on said at least one computer readable medium, said at least one computer readable medium consisting of an element selected from the group consisting of an electronic storage device, an optical storage device, and a magnetic storage device, said computer readable program code comprising:
       i. code for determining a priority of each of a plurality of data sources requesting credits;
       ii. code which, for each of said plurality of data sources, calculates a credit request total by adding a number of credits requested by said data source plus a number of credits requested by each of said plurality of data sources having a priority greater than said data source; and
       iii. code for identifying a largest credit request total for which sufficient credits are available, and for granting a request of each data source whose credit request was included in said largest credit request total and for denying requests for which sufficient credits are not available.

12. The apparatus of claim 11, wherein said code calculates said plurality of credit request totals in parallel.

13. The apparatus of claim 11, further comprising code for reading a credit counter to obtain an available credit count.

14. The apparatus of claim 11, wherein said code for determining a priority of each of said requesting data sources comprises code for ranking said plurality of data sources from highest priority to lowest priority.

15. An apparatus for controlling data flow to a storage device, comprising:
    a. at least one computer readable medium; and
    b. computer readable program code stored on said at least one computer readable medium, said at least one computer readable medium consisting of an element selected from the group consisting of an electronic storage device, an optical storage device, and a magnetic storage device, said computer readable program code comprising:
       i. code for determining a priority of each of a plurality of data sources requesting credits;
       ii. code which, for each of said plurality of data sources, calculates a credit request total by adding a number of credits requested by said data source plus a number of credits requested by each of said plurality of data sources having a priority greater than said data source; and
       iii. code for identifying a largest credit request total for which sufficient credits are available, and for granting a request of each data source whose credit request was included in said largest credit request total and for denying request for which sufficient credits are not available, wherein said code for determining a priority of each of said requesting data sources comprises code for ranking said plurality of data sources from highest priority to lowest priority, and wherein said code for identifying said largest credit request total for which sufficient credits are available comprises code for comparing said credit request totals one by one with an available number of credits, beginning with a credit request total corresponding to a highest priority data source, and continuing with a credit request total corresponding to a next highest priority data source, and so on with data sources of decreasing priority, until said largest credit request total, which is not greater than said available number of credits, is reached.

* * * * *

UNITED STATES PATENT AND TRADEMARK OFFICE
CERTIFICATE OF CORRECTION

| | |
|---|---|
| PATENT NO. | : 7,373,467 B2 |
| APPLICATION NO. | : 11/032753 |
| DATED | : May 13, 2008 |
| INVENTOR(S) | : Brian William Hughes |

Page 1 of 1

It is certified that error appears in the above-identified patent and that said Letters Patent is hereby corrected as shown below:

In column 4, line 66, delete "DS2_send" and insert -- DS2_can_send --, therefor.

In column 5, line 5, delete "92" and insert -- 96 --, therefor.

In column 5, line 37, delete "20" and insert -- 120 --, therefor.

In column 10, line 50, in Claim 15, delete "request" and insert -- requests --, therefor.

Signed and Sealed this

Fifth Day of August, 2008

JON W. DUDAS
*Director of the United States Patent and Trademark Office*